US008606566B2

(12) United States Patent
Li et al.

(10) Patent No.: US 8,606,566 B2
(45) Date of Patent: Dec. 10, 2013

(54) SPEECH ENHANCEMENT THROUGH PARTIAL SPEECH RECONSTRUCTION

(75) Inventors: Xueman Li, Burnaby (CA); Rajeev Nongpiur, Burnaby (CA); Frank Linseisen, North Vancouver (CA); Phillip A. Hetherington, Port Moody (CA)

(73) Assignee: QNX Software Systems Limited, Kanata, Ontario (CA)

( * ) Notice: Subject to any disclaimer, the term of this patent is extended or adjusted under 35 U.S.C. 154(b) by 1130 days.

(21) Appl. No.: 12/126,682

(22) Filed: May 23, 2008

(65) Prior Publication Data

US 2009/0112579 A1 Apr. 30, 2009

Related U.S. Application Data

(63) Continuation-in-part of application No. 11/923,358, filed on Oct. 24, 2007, now Pat. No. 8,015,002.

(51) Int. Cl.
*G10L 21/02* (2013.01)
*G10L 15/20* (2006.01)

(52) U.S. Cl.
USPC ........... 704/205; 704/225; 704/226; 704/228; 704/260; 704/211

(58) Field of Classification Search
USPC ......... 704/211, 224–226, 500–504, 258–260, 704/205
See application file for complete search history.

(56) References Cited

U.S. PATENT DOCUMENTS 4,853,963 A * 8/1989 Bloy et al. .................... 704/225
5,406,635 A * 4/1995 Jarvinen ...................... 381/94.3
5,408,580 A * 4/1995 Stautner et al. ............... 704/205
5,414,796 A 5/1995 Jacobs et al.
5,493,616 A * 2/1996 Iidaka et al. ................. 381/71.4
5,499,301 A * 3/1996 Sudo et al. .................... 381/71.3
5,524,057 A * 6/1996 Akiho et al. ................. 381/94.7
5,692,052 A * 11/1997 Tanaka et al. ................ 381/71.9
5,701,393 A * 12/1997 Smith et al. .................... 704/258
5,978,783 A * 11/1999 Meyers et al. .................. 706/21

(Continued)

FOREIGN PATENT DOCUMENTS

EP 1 450 354 A1 8/2004
JP 2000-347688 12/2000

(Continued)

OTHER PUBLICATIONS

Martinez et al. "Combination of adaptive filtering and spectral subtraction for noise removal", Circuits and Systems, 2001. ISCAS 2001, pp. 793-796 vol. 2.*

(Continued)

*Primary Examiner* — Pierre-Louis Desir
*Assistant Examiner* — Abdelali Serrou
(74) *Attorney, Agent, or Firm* — Brinks Gilson & Lione

(57) ABSTRACT

A system improves speech intelligibility by reconstructing speech segments. The system includes a low-frequency reconstruction controller programmed to select a predetermined portion of a time domain signal. The low-frequency reconstruction controller substantially blocks signals above and below the selected predetermined portion. A harmonic generator generates low-frequency harmonics in the time domain that lie within a frequency range controlled by a background noise modeler. A gain controller adjusts the low-frequency harmonics to substantially match the signal strength to the time domain original input signal.

22 Claims, 14 Drawing Sheets

(56) References Cited

U.S. PATENT DOCUMENTS

| | | | | |
|---|---|---|---|---|
| 5,978,824 | A | 11/1999 | Ikeda | |
| 6,044,068 | A | 3/2000 | El Malki | |
| 6,144,937 | A * | 11/2000 | Ali | 704/233 |
| 6,163,608 | A | 12/2000 | Romesburg et al. | |
| 6,263,307 | B1 | 7/2001 | Arslan et al. | |
| 6,336,092 | B1 * | 1/2002 | Gibson et al. | 704/268 |
| 6,493,338 | B1 | 12/2002 | Preston et al. | |
| 6,570,444 | B2 * | 5/2003 | Wright | 330/149 |
| 6,690,681 | B1 | 2/2004 | Preston et al. | |
| 6,741,874 | B1 | 5/2004 | Novorita et al. | |
| 6,771,629 | B1 | 8/2004 | Preston et al. | |
| 6,862,558 | B2 * | 3/2005 | Huang | 702/194 |
| 6,963,649 | B2 * | 11/2005 | Vaudrey et al. | 381/94.7 |
| 7,072,831 | B1 | 7/2006 | Etter | |
| 7,142,533 | B2 | 11/2006 | Ghobrial et al. | |
| 7,146,324 | B2 | 12/2006 | Den Brinker et al. | |
| 7,366,161 | B2 | 4/2008 | Mitchell et al. | |
| 7,580,893 | B1 * | 8/2009 | Suzuki | 705/51 |
| 7,716,046 | B2 * | 5/2010 | Nongpiur et al. | 704/226 |
| 7,773,760 | B2 * | 8/2010 | Sakamoto et al. | 381/71.9 |
| 7,792,680 | B2 | 9/2010 | Iser et al. | |
| 8,015,002 | B2 | 9/2011 | Li et al. | |
| 2001/0006511 | A1 | 7/2001 | Matt | |
| 2001/0018650 | A1 | 8/2001 | DeJaco | |
| 2001/0054974 | A1 * | 12/2001 | Wright | 341/144 |
| 2003/0050767 | A1 | 3/2003 | Bar-Or | |
| 2003/0055646 | A1 | 3/2003 | Yoshioka et al. | |
| 2004/0066940 | A1 | 4/2004 | Amir | |
| 2004/0153313 | A1 * | 8/2004 | Aubauer et al. | 704/206 |
| 2004/0167777 | A1 * | 8/2004 | Hetherington et al. | 704/226 |
| 2005/0065792 | A1 | 3/2005 | Gao | |
| 2005/0119882 | A1 | 6/2005 | Bou-Ghazale | |
| 2006/0100868 | A1 * | 5/2006 | Hetherington et al. | 704/226 |
| 2006/0136203 | A1 * | 6/2006 | Ichikawa | 704/226 |
| 2006/0142999 | A1 * | 6/2006 | Takada et al. | 704/205 |
| 2006/0293016 | A1 * | 12/2006 | Giesbrecht et al. | 455/308 |
| 2007/0025281 | A1 | 2/2007 | McFarland et al. | |
| 2007/0058822 | A1 * | 3/2007 | Ozawa | 381/94.1 |
| 2007/0185711 | A1 | 8/2007 | Jang et al. | |
| 2007/0237271 | A1 | 10/2007 | Pessoa et al. | |
| 2008/0077399 | A1 * | 3/2008 | Yoshida | 704/208 |
| 2008/0120117 | A1 * | 5/2008 | Choo et al. | 704/500 |
| 2008/0262849 | A1 * | 10/2008 | Buck et al. | 704/275 |
| 2009/0112579 | A1 | 4/2009 | Li et al. | |
| 2009/0112584 | A1 | 4/2009 | Li et al. | |
| 2009/0216527 | A1 * | 8/2009 | Oshikiri | 704/228 |

FOREIGN PATENT DOCUMENTS

| | | |
|---|---|---|
| JP | 2002-171225 | 6/2002 |
| JP | 2002-221988 | 8/2002 |
| JP | 2004-254322 | 9/2004 |
| WO | WO 01/73760 A1 | 10/2001 |

OTHER PUBLICATIONS

Ephraim, Yariv et al., "Speech Enhancement Using a Minimum Mean-Square Error Short-Time Spectral Amplitude Estimator," *IEEE Transactions on Acoustics, Speech, and Signal Processing*, vol. ASSP-32, No. 6, Dec. 1984, pp. 1109-1121.

Ephraim, Y. et al., "Speech Enhancement Using a Minimum Mean-Square Error Log-Spectral Amplitude Estimator," *IEEE Transactions on Acoustic, Speech, and Signal Processing*, vol. ASSP-33, No. 2, Apr. 1985, pp. 443-445.

Linhard, Klaus et al., "Spectral Noise Subtraction with Recursive Gain Curves," *Daimler Benz AG, Research and Technology*, Jan. 9, 1998, 4 pages.

Extended European Search Report dated Jan. 23, 2012 for corresponding European Application No. 08018600.0, 11 pages.

Office Action dated Apr. 10, 2012 for corresponding Japanese Patent Application No. 2008-273648, 10 pages.

* cited by examiner

SPEECH ENHANCEMENT THROUGH PARTIAL SPEECH RECONSTRUCTION

PRIORITY CLAIM

This application is a continuation-in-part of U.S. application Ser. No. 11/923,358, entitled “Dynamic Noise Reduction” filed Oct. 24, 2007, which is incorporated by reference.

BACKGROUND OF THE INVENTION

1. Technical Field

This disclosure relates to a speech processes, and more particularly to a process that improves intelligibility and speech quality.

2. Related Art

Processing speech in a vehicle is challenging. Systems may be susceptible to environmental noise and vehicle interference. Some sounds heard in vehicles may combine with noise and other interference to reduce speech intelligibility and quality.

Some systems suppress a fixed amount of noise across large frequency bands. In noisy environments, high levels of residual noise may remain in the lower frequencies as often in-car noises are more severe in lower frequencies than in higher frequencies. The residual noise may degrade the speech quality and intelligibility.

In some situations, systems may attenuate or eliminate large portions of speech while suppressing noise making voiced segments unintelligible. There is a need for a speech reconstruction system that is accurate, has minimal latency, and reconstructs speech across a perceptible frequency band.

SUMMARY

A system improves speech intelligibility by reconstructing speech segments. The system includes a low-frequency reconstruction controller programmed to select a predetermined portion of a time domain signal. The low-frequency reconstruction controller substantially blocks signals above and below the selected predetermined portion. A harmonic generator generates low-frequency harmonics in the time domain that lie within a frequency range controlled by a background noise modeler. A gain controller adjusts the low-frequency harmonics to substantially match the signal strength to the time domain original input signal.

Other systems, methods, features, and advantages will be, or will become, apparent to one with skill in the art upon examination of the following figures and detailed description. It is intended that all such additional systems, methods, features, and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Hands-free systems, communication devices, and phones in vehicles or enclosures are susceptible to noise. The spatial, linear, and non-linear properties of noise may suppress or distort speech. A speech reconstruction system improves speech quality and intelligibility by dynamically generating sounds that may otherwise be masked by noise. A speech reconstruction system may produce voice segments by generating harmonics in select frequency ranges or bands. The system may improve speech intelligibility in vehicles or systems that transport persons or things.

Figure 1:
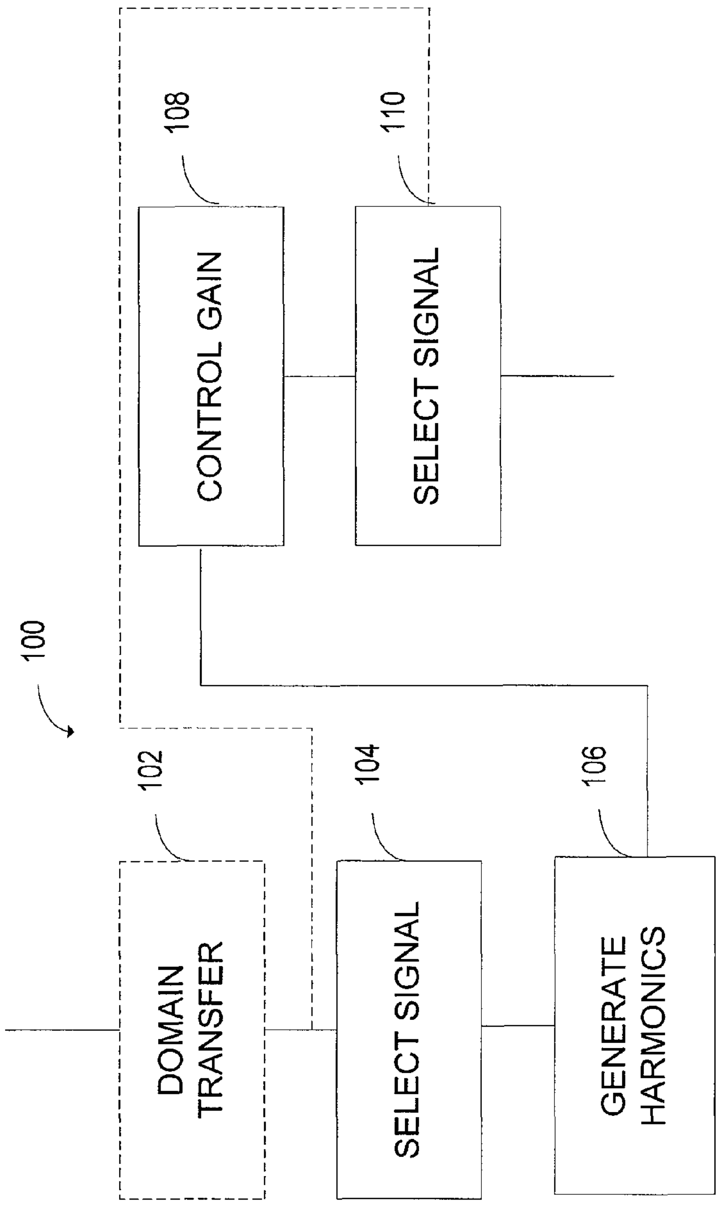
FIG. 1 is a speech enhancement process.

FIG. 1 is a continuous (e.g., real-time) or batch process 100 that compensates for the undesired changes (e.g., distortion) in a voiced or speech segment. The process reconstructs low frequency speech using speech signal information occurring at higher frequencies. When speech is received, it may be converted to the time domain at 102 (optional if received as a time domain signal). At 104 the process selects signals within a predetermined frequency range (e.g., band). Since harmonic components may be more prominent at higher frequencies when high levels of noise corrupt the lower frequency speech signal, the process selects an intermediate band lying or occurring near a lower frequency range. A non-linear oscillating process or a non-linear function may generate or synthesize harmonics by processing the signals within the intermediate frequency range at 106. The correlation between the strength of the synthesized harmonics and the original input signal may determine a gain or factor applied to the synthesized harmonics at 108. In some processes, the gain comprises a dynamic, variable, or continuously changing gain that correlates to the changing strength of the speech signal. A perceptual weighting processes the output of the gain control 108. Signal selection 110 may include an optional post filter process that selectively passes certain portions of the output of the gain control and portions of signals while minimizing or dampening other portions. In some systems the post filter process selects signals by dynamically varying gain and/or cutoff limits, or bandpass characteristics of a transfer function in relation to the strength of a detected background noise or an estimated noise.

Figure 2:
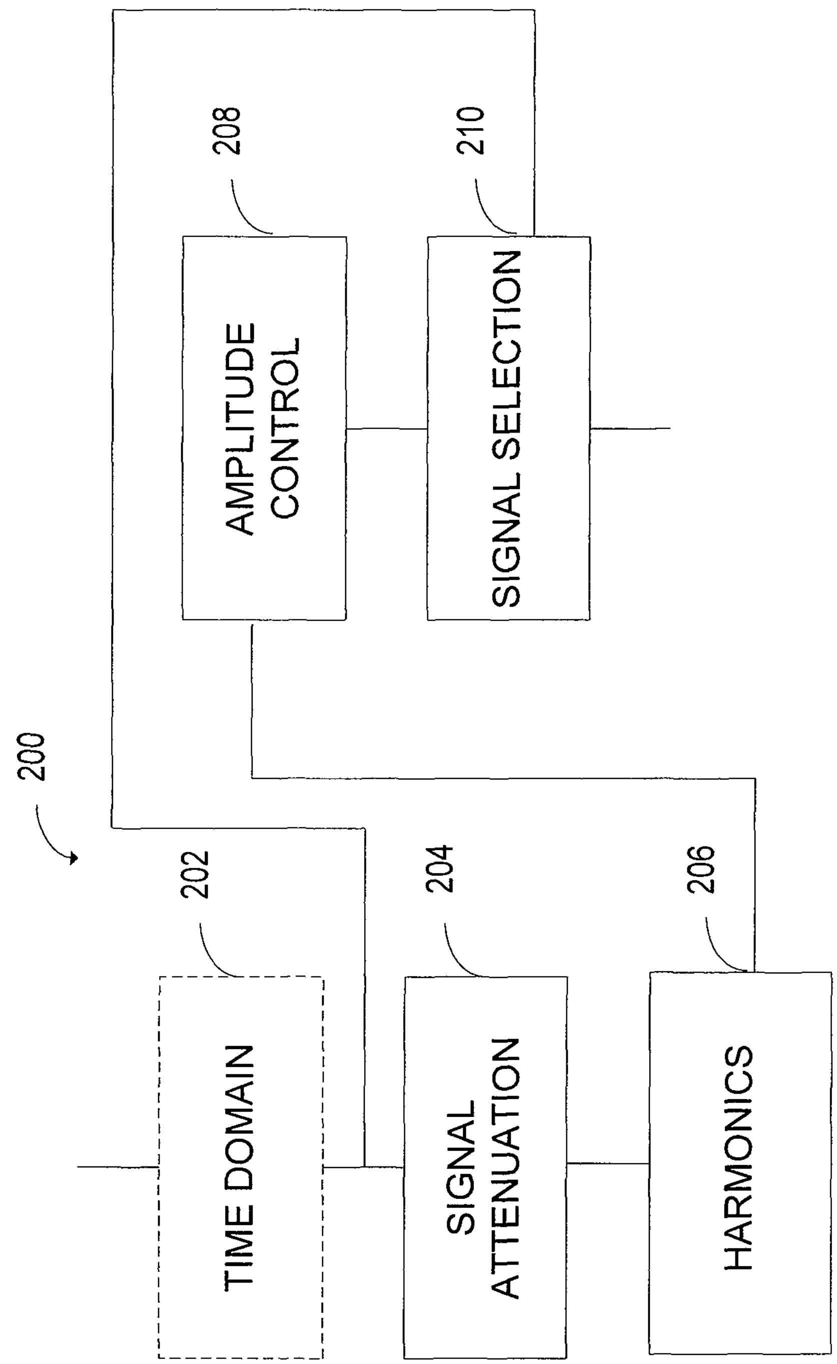
FIG. 2 is a second speech enhancement process.

FIG. 2 is an alternate continuous (e.g., real-time) or batch process 200 that compensates for noise components or other interference that may distort speech. When a speech signal is received, it may be converted into a time domain signal at 202

(optional). At 204 the process selectively passes certain portions of the signal while minimizing or dampening those above and below the passband (e.g., like a bandpass filtering process). A harmonic generating process 206 generates harmonics in the time domain. The amplitudes of the low frequency harmonics may be adjusted at 208 to match the signal strength of the original speech signal. At 210 portions of the adjusted low frequency harmonics are selected. In some processes, the signal selection may be optimized to the listening or receiving characteristics (e.g., system conditions, vehicle interior, or environment) or the enclosure characteristics to improve speech intelligibility. The selected portions of the signal may then be added to portions of the unprocessed speech signal by an adding or combining process that may be part of alternate signal selection process 210.

Figure 3:
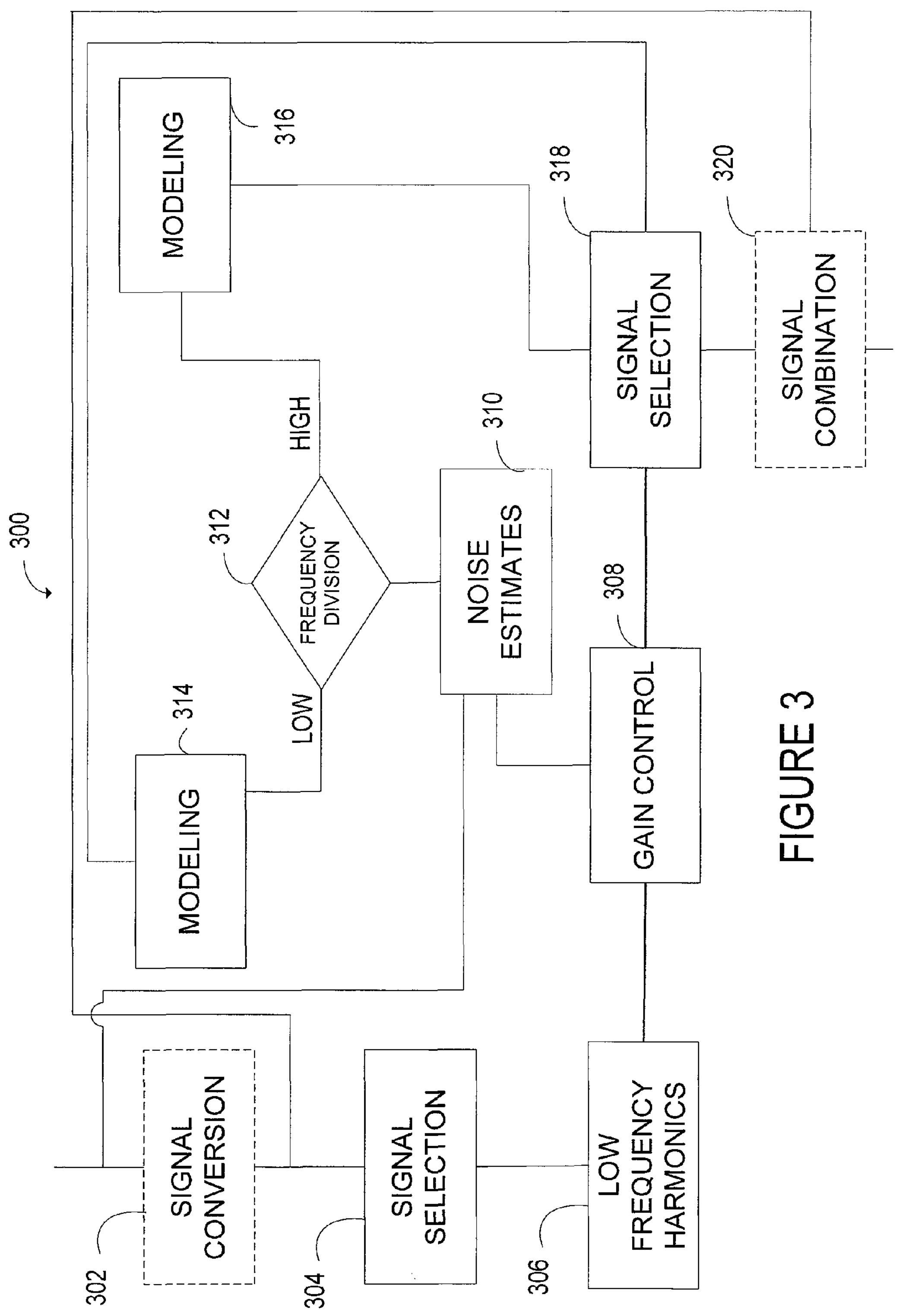
FIG. 3 is a third speech enhancement process.

FIG. 3 is a second alternate real-time or delayed speech enhancement process 300 that reconstructs speech masked by changing noise conditions in a vehicle. The noise may comprise a car noise, street noise, babble noise, weather noise, environmental noise, and/or music. In cars and/or other vehicles, the noise may include engine noise, road noise, transient noises (e.g., when another vehicle is passing) or a fan noise. When speech is reconstructed, an input may be converted into the time domain (if the input is not a time domain signal) at optional 302 when or after speech is detected by a voice activity detecting process (not shown). A frequency selector may select band limited frequencies between the upper and lower limits of an aural bandwidth at 304. In some processes, the selected frequency band may lie or occur near a low frequency range. A non-linear oscillating process, non-linear process, and/or harmonic generating process may generate harmonics that may lie or occur in the full frequency range at 306. The power ratio between the input signal and the generated harmonics may determine the gain that increases or reduces the signal strength or amplitude of the generated harmonics at 308.

A portion of the amplitude adjusted signal is selected at 318. The selection may occur through a dynamic process that allows substantially all frequencies below a threshold to pass to an output while substantially blocking or substantially attenuating signals that occur above the threshold. In one process, the selection process may be based on multiple (e.g., two, three, or more) linear models that model a background noise or any other noise.

One exemplary process digitizes an input speech signal (optional if received as a digital signal). The input may be converted to frequency domain by means of a Short-Time Fourier Transform (STFT) that separates the digitized signals into frequency bins.

The background noise power in the signal may be estimated at an nth frame at 310. The background noise power of each frame $B_n$, may be converted into the dB domain as described by equation 1.

$$\phi_n = 10 \log_{10} B_n \tag{1}$$

The dB power spectrum may be divided into a low frequency portion and a high frequency portion at 312. The division may occur at a predetermined frequency $f_o$ such as a cutoff frequency, which may separate multiple linear regression models at 314 and 316. An exemplary process may apply two substantially linear models or the linear regression models described by equations 2 and 3.

$$Y_L = a_L X_L + b_L \tag{2}$$

$$Y_H = a_H X_H + b_H \tag{3}$$

In equations 2 and 3, X is the frequency, Y is the dB power of the background noise, $a_L$, $a_H$ are the slopes of the low and high frequency portion of the dB noise power spectrum, $b_L$, $b_H$ are the intercepts of the two lines when the frequency is set to zero.

Based on the difference between the intercepts of the low and high frequency portions of the dB, the scalar coefficients (e.g., $m_1(k)$, $m_2(k)$, $m_L(k)$) of the transfer function of an exemplary dynamic selection process 318 may be determined by equations 4 and 5.

$$m_i(k) = f_i(b) \tag{4}$$

In this process, b is the dynamic noise level expressed as equation 5 and $$b = b_L - b_h \tag{5}$$

$b_L$, $b_H$ are the intercepts of the two linear models (equations 2 and 3) which model the background noise in low and high frequency ranges.

$$h(k) = m_1(k)h_1 + m_2(k)h_2 + \ldots + m_L(k)h_L \tag{6}$$

Figure 6:
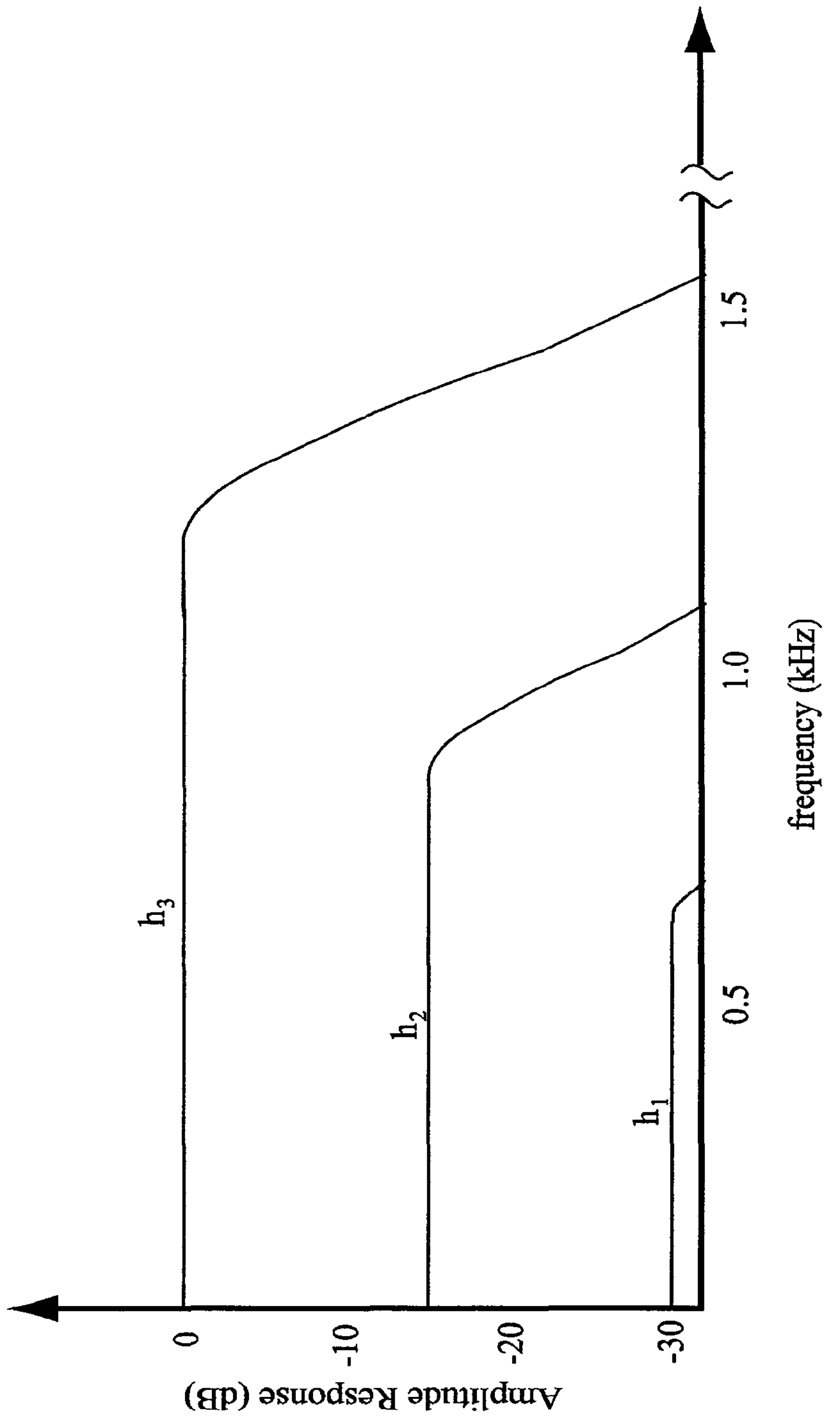
FIG. 6 is an amplitude response of multiple filter coefficients.

In equation 6, h(k) is the updated filter coefficients vector, $h_1, h_2, \ldots, h_L$ that may comprise the L basis filter coefficient vectors. In an exemplary application having three filter coefficient vectors, $m_1h_1$, $m_2h_2$, and $m_3h_3$, may have a maximally flat or monotonic passbands and a smooth roll offs, respectively, as shown in FIG. 6.

An optional signal combination process 320 may combine the output of the signal selection process 318 with the input signal received. In some processes a perceptual weighting process combines the output of the signal selection process with the input signal. The perceptual weighting process may emphasize the harmonics structure of the speech signal and/or modeled harmonics allowing the noise or discontinuities that lie between the harmonics to become less audible.

Figure 13:
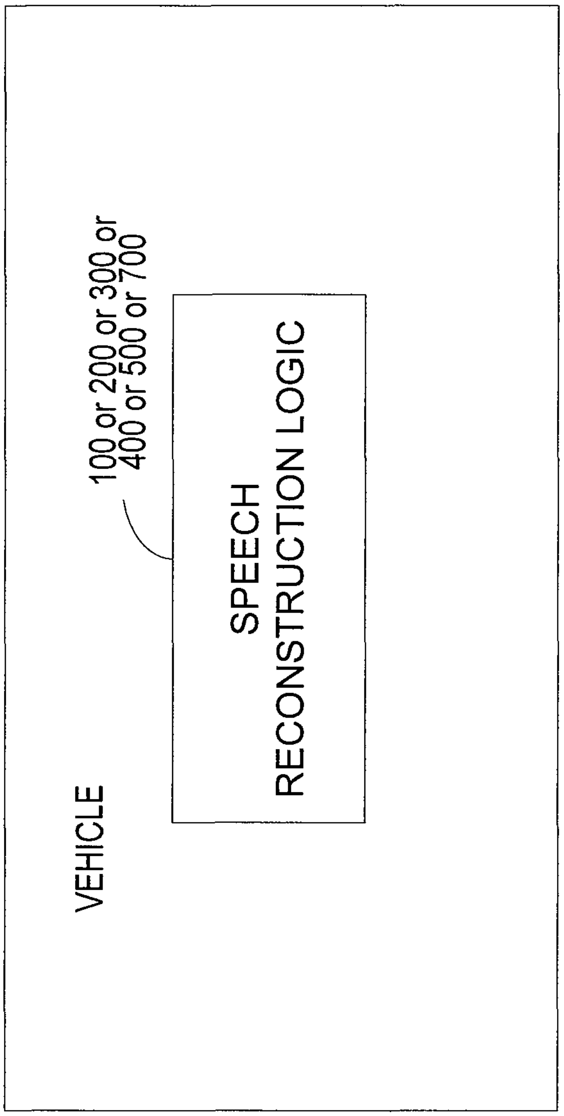
FIG. 13 is a speech reconstruction system integrated within a vehicle.
Figure 14:
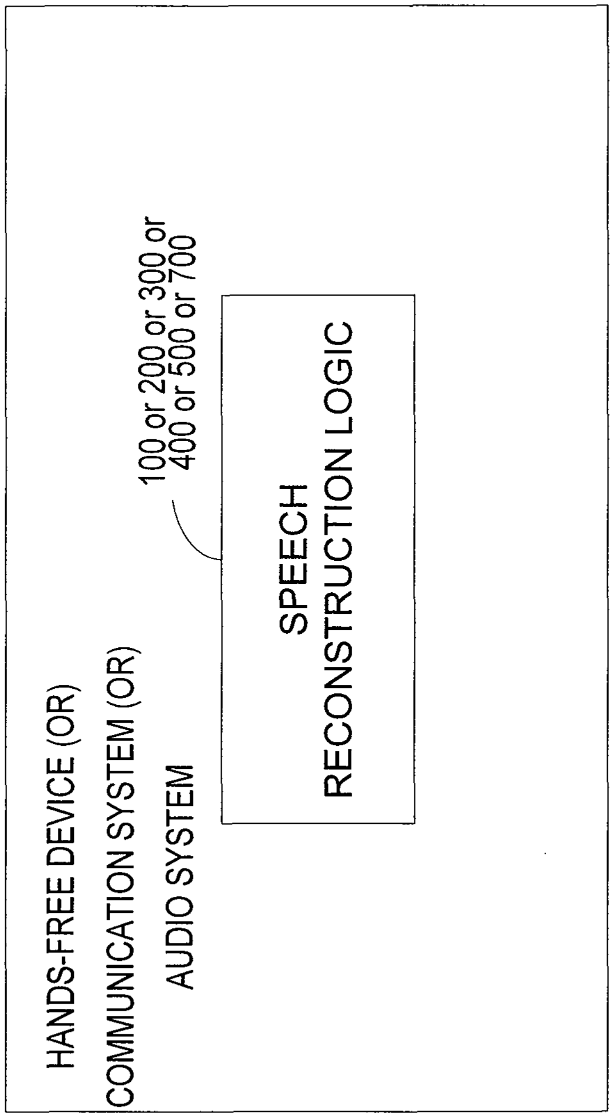
FIG. 14 is a speech reconstruction system integrated within a hands-free communication device, a communication system, and/or an audio system.

The methods and descriptions of FIGS. 1, 2, and 3 may be encoded in a signal bearing medium, a computer readable medium such as a memory that may comprise unitary or separate logic, programmed within a device such as one or more integrated circuits, or processed by a controller or a computer. If the methods are performed by software, the software or logic may reside in a memory resident to or interfaced to one or more processors or controllers, a wireless communication interface, a wireless system, an entertainment and/or comfort controller of a vehicle or types of non-volatile or volatile memory remote from or resident to a speech enhancement system. The memory may retain an ordered listing of executable instructions for implementing logical functions. A logical function may be implemented through digital circuitry, through source code, through analog circuitry, or through an analog source such through an analog electrical, or audio signals. The software may be embodied in any computer-readable medium or signal-bearing medium, for use by, or in connection with an instruction executable system, apparatus, device, resident to a hands-free system or communication system or audio system shown in FIG. 14 and/or may be part of a vehicle as shown in FIG. 13. Such a system may include a computer-based system, a processor-containing system, or another system that includes an input and output interface that may communicate with an automotive or wireless communication bus through any hardwired or wireless automotive communication protocol or other hardwired or wireless communication protocols.

A computer-readable medium, machine-readable medium, propagated-signal medium, and/or signal-bearing medium may comprise any medium that contains, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical or tangible connection having one or more wires, a portable magnetic or optical disk, a volatile memory such as a Random Access Memory "RAM" (electronic), a Read-Only Memory "ROM," an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled by a controller, and/or interpreted or otherwise processed. The processed medium may then be stored in a local or remote computer and/or machine memory.

Figure 4:
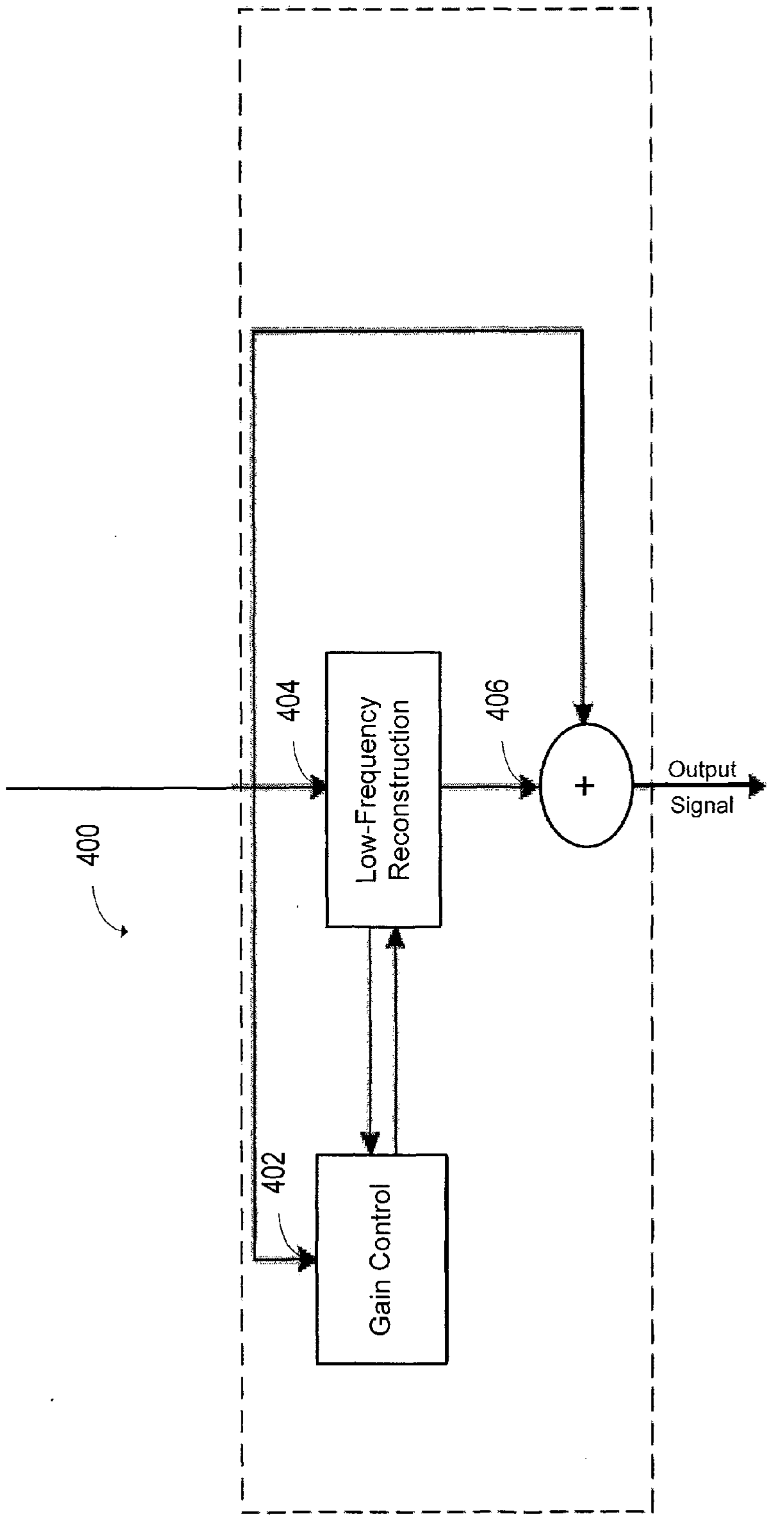
FIG. 4 is a speech reconstruction system.

FIG. 4 is a speech reconstruction system 400 that may restore speech. When a speech signal is received, it may be converted into a time domain signal by an optional converter (not shown). A low-frequency reconstruction controller 404 selects certain portions of the time domain signal while minimizing or dampening those above and below a selected or variable passband. A harmonic generator within or coupled to the low-frequency reconstruction controller 404 generates harmonics in the time domain. The amplitudes of the low frequency harmonics may be adjusted by the gain controller 402 programmed or configured to substantially match the signal strength or signal power to a predetermined level (e.g., a desired listening condition or receiving level) or to the strength of the original signal. Portions of the adjusted low frequency harmonics are combined with portions of the input at the low-frequency reconstruction controller 404 through an adder or weighting filter 406. In some systems, the output signal may be optimized to listening or receiving conditions (the listening or receiving environment), enclosure characteristics, or an interior of a vehicle. In some applications, the adding filter or weighting filter 406 may comprise a dynamic filter programmed or configured to emphasizes (e.g., amplify or attenuate) more of the generated harmonics (reconstructed speech) than the input signal during periods of minimal speech (e.g., identified by a voice activity detector) and/or when high levels of background noise are detected (e.g., identified by a noise detector) in real-time or after a delay.

Figure 5:
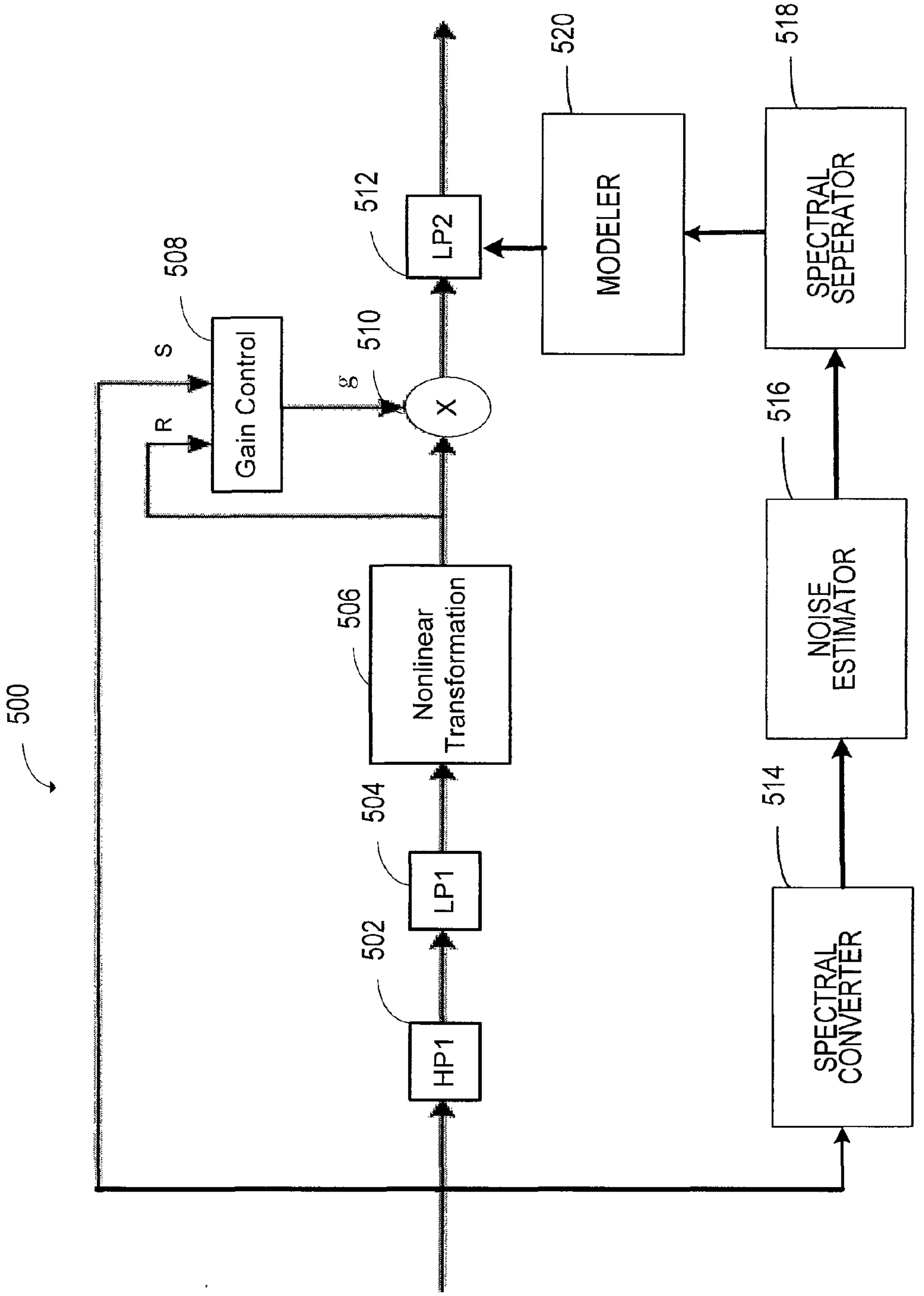
FIG. 5 is a second speech reconstruction system.

FIG. 5 is an alternate speech reconstruction system 500. The system 500 may restore speech that is masked or distorted by an undesired signal. When a speech signal is received, filters pass signals within a desired frequency range (or band) while blocking or substantially dampening (or attenuating) signals that are outside of the frequency range. A bandpass filter or a highpass filter feedings a lowpass filter (or a lowpass filter feeding a highpass filter) may pass the desired signals. In some speech reconstruction systems, the bandpass filter may have cutoff frequencies of about 1200 Hz and about 3000 Hz, respectively.

When implemented through multiple filters, a highpass and a lowpass filter, for example, the high-pass filter may have a cutoff frequency at around 1200 Hz and the lowpass filter may have cutoff frequency at around 3000 Hz. The filters may comprise finite impulse response filters (FIR filter) and/or an infinite impulse response filters (IIR filter). To maintain a frequency response that is as flat as possible in the passbands (having a maximally flat or monotonic magnitude) and rolls off smoothly the filters may be implemented as a second order Butterworth filter having responses expressed as equations 7 and 8.

$$H_{HP}(z) = \frac{a_{H0} + a_{H1}z^{-1} + a_{H2}z^{-2}}{1 + b_{H1}z^{-1} + b_{H2}z^{-2}} \tag{7}$$

$$H_{LP}(z) = \frac{a_{L0} + a_{L1}z^{-1} + a_{L2}z^{-2}}{1 + b_{L1}z^{-1} + b_{L2}z^{-2}} \tag{8}$$

The filters' coefficients may comprise $a_{H0}=0.5050$; $a_{H1}=-1.0100$; $a_{H2}=0.5050$; $b_{H1}=-0.7478$; and $b_{H2}=0.2722$. $a_{L0}=0.5690$; $a_{L1}=1.1381$; $a_{L2}=0.5690$; $b_{L1}=0.9428$; and $b_{L2}=0.3333$ A nonlinear transformation controller 506 may reconstruct speech by generating harmonics in the time domain. The nonlinear transformation controller 506 may generate harmonics through one, two, or more functions, including, for example, through a full-wave rectification function, half-wave rectification function, square function, and/or other nonlinear functions. Some exemplary functions are expressed in equations 9, 10, and 11.

$$\text{Half-wave rectification function: } f(x) = \begin{cases} x & \text{if } x \geq 0 \\ 0 & \text{if } x < 0 \end{cases} \tag{9}$$

$$\text{Full-wave rectification function: } f(x) = |x| \tag{10}$$

$$\text{Square function: } f(x) = x^2 \tag{11}$$

The amplitudes of the harmonics may be adjusted by a gain control 508 and multiplier 510. The gain may be determined by a ratio of energies measured or estimated in the original speech signal (S) and the reconstructed signal (R) as expressed by equation 12.

$$g = \frac{\sum_{t=0}^{T} |S(t)|}{\sum_{t=0}^{T} |R(t)|} \tag{12}$$

A perceptual filter processes the output of the multiplier 510. The filter selectively passes certain portions of the adjusted output while minimizing or dampening the remaining portions. In some systems, a dynamic filter selects signals by dynamically varying gain and/or cutoff limits or characteristics based on the strength of a detected background noise or an estimated noise in time. The gain and cutoff frequency or frequencies may vary according to the amount of dynamic noise detected or estimated in the speech signal.

In FIG. 5, an exemplary lowpass filter 512 may have a frequency response expressed by equation 6.

$$h(k)=m_1(k)h_1+m_2(k)h_2+ \ldots +m_L(k)h_L \tag{6}$$

h(k) is the updated filter coefficients vector, $h_1, h_2, \ldots, h_L$. The filter coefficient may be updated on a temporal basis or by iteration of some or every speech segment using an exemplary dynamic noise function $f_i(.)$. The dynamic noise function may be described by equation 4.

$$m_i(k)=f_i(b) \tag{4}$$

In equation 4, b comprises a dynamic noise level expressed by equation 5.

$$b=b_L-b_h \tag{5}$$

In this example, $b_L$, $b_H$ comprise the dynamic noise levels or intercepts of multiple linear models that describe the background noise in low and high aural frequency ranges. In this relationship, the more dynamic noise levels or intercepts differ, the larger the bandwidth and amplitude response of the filter. When the differences in the dynamic noise levels or intercepts are small, the bandwidth and amplitude response of the low-pass filter is small.

The linear models may be approximated in the decibel power domain. A spectral converter 514 may convert the time domain speech signal into the frequency domain. A background noise estimator 516 measures or estimates the continuous or ambient noise that may accompany the speech signal. The background noise estimator 516 may comprise a power detector that averages the acoustic when little or no speech is detected. To prevent biased noise estimations during transients, a transient detector (not shown) may disable the background noise estimator during abnormal or unpredictable increases in power in some alternate systems.

A spectral separator 518 may divide the estimated noise power spectrum into multiple sub-bands including a low frequency and middle frequency band and a high frequency band. The division may occur at a predetermined frequency or frequencies such as at designated cutoff frequency or frequencies.

To determine the required signal reconstruction, a modeler 520 may fit separate lines to selected portions of the noise power spectrum. For example, the modeler 520 may fit a line to a portion of the low and/or medium frequency spectrum and may fit a separate line to a portion of the high frequency portion of the spectrum. Using linear regression logic, a best-fit line may model the severity of a vehicle noise in two or more portions of the spectrum.

In an exemplary application have three filter-coefficient vectors, $h_1, h_2, \ldots, h_3$, the filter-coefficients vectors may have amplitude responses of FIG. 6 and scalar coefficients described by equation 14.

$$\begin{bmatrix} m_1 \\ m_2 \\ m_3 \end{bmatrix} = \begin{cases} [1, 0, 0]^T & \text{if} \quad b < t1 \\ \left[\frac{b-t1}{t2-t1}, \frac{t2-b}{t2-t1}, 0\right]^T & \text{if} \quad t1 < b < t2 \\ \left[0, \frac{b-t1}{t2-t1}, \frac{t3-b}{t3-t2}\right]^T & \text{if} \quad t2 < b < t3 \\ [0, 0, 1]^T & \text{if} \quad b > t3 \end{cases} \tag{14}$$

Here the thresholds t1, t2, and t3 may be estimated empirically and may lie within the range 0<t1<t2<t3<1.

Figure 7:
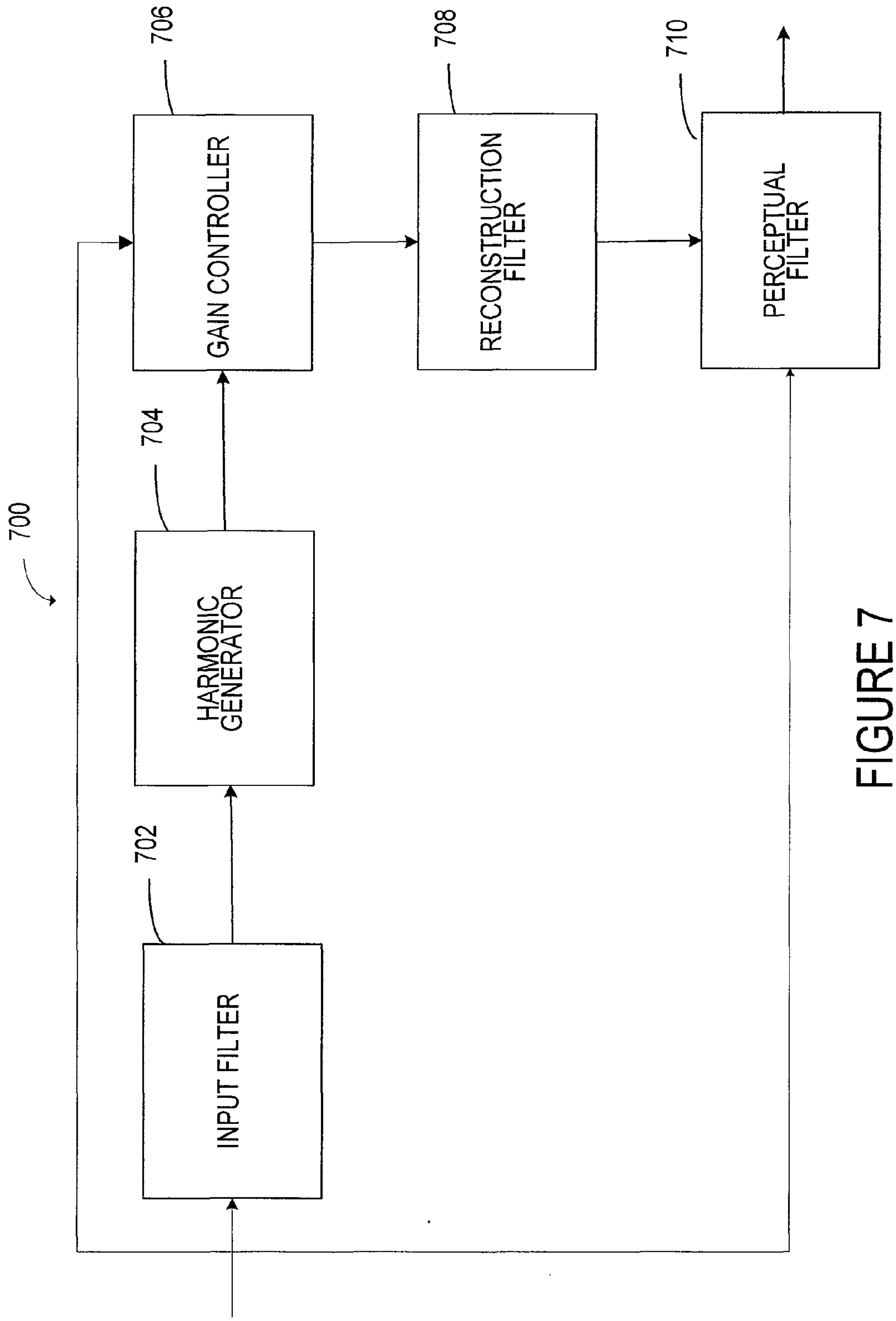
FIG. 7 is a third speech reconstruction system.

FIG. 7 is an alternate speech reconstruction system 700 that may reconstruct speech in real time or after a delay. When speech is detected by an optional voice activity detector (not shown) an input filter 702 may pass band limited frequencies between the upper and lower limits of an aural bandwidth. The selected frequency band may lie or occur near a low frequency range where harmonics are more likely to be corrupted by noise. A harmonic generator 704 may be programmed to reconstruct portions of speech by generating harmonics that may lie or occur in low frequency range and high frequency range. The total power of the input speech signal relative to the total power of generated harmonics may determine the gain (e.g., amplitude adjustment) applied by gain controller 706. The gain controller 706 may dynamically (e.g., continuously vary) increase and/or decrease the signal strength or amplitude of the modeled harmonics at 308 to a targeted level based on an input (e.g., a signal that may lie or occur within the aural bandwidth). In some systems the gain does not change the phase or minimally changes the phase.

A portion of the amplitude adjusted signal is selected by a speech reconstruction filter 708. The speech reconstruction filter 708 may allow substantially all frequencies below a threshold to pass through while substantially blocking or substantially attenuating signals above a variable threshold. A perceptual filter 710 combines the output of the reconstruction filter 708 with the input speech signal filter 702.

FIGS. 8-12 show the time varying spectral characteristics of a speech signal graphically through spectrographs. In these figures the vertical dimension corresponds to frequency and the horizontal dimension to time. The darkness of the patterns is proportional to signal energy. Thus the resonance frequencies of the vocal tract show up as dark bands and the noise shows up as a diffused darkness that becomes darker at lower frequencies. The voiced regions are characterized by their striated appearances due to their periodicity.

Figure 8:
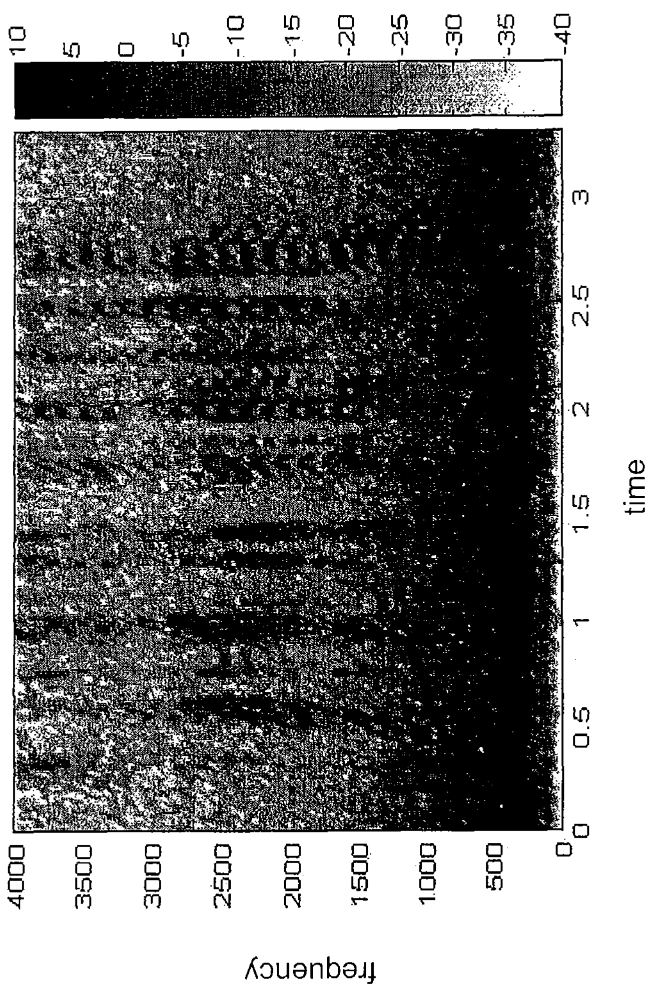
FIG. 8 is a spectrogram of a speech signal and a vehicle noise of high intensity.
Figure 9:
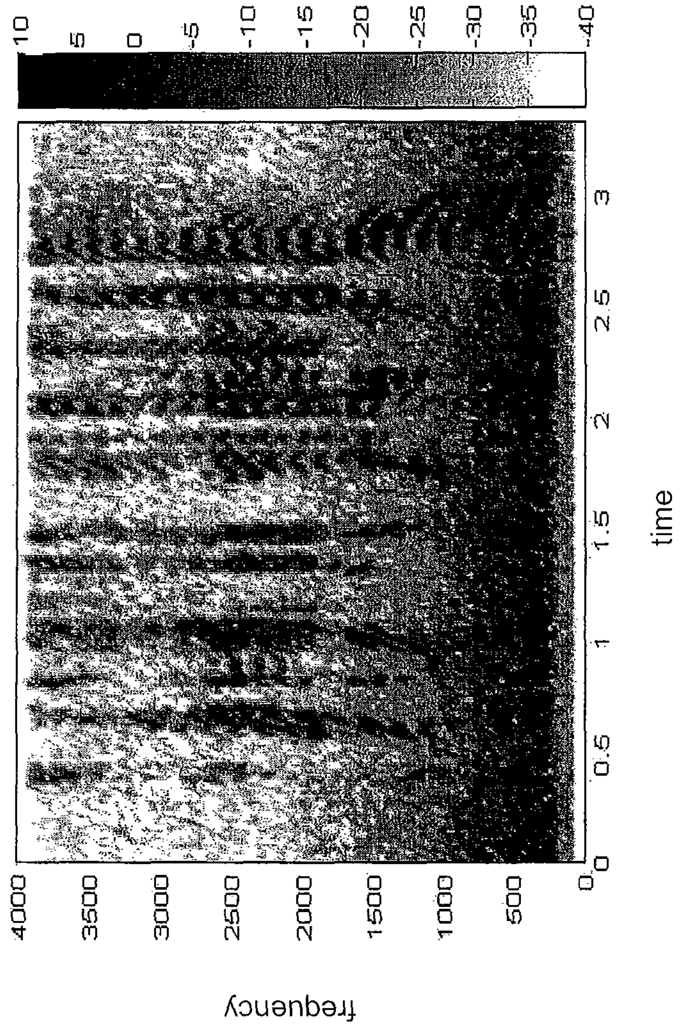
FIG. 9 is a spectrogram of an enhanced speech signal and a vehicle noise of high intensity processed by a static noise suppression method.
Figure 10:
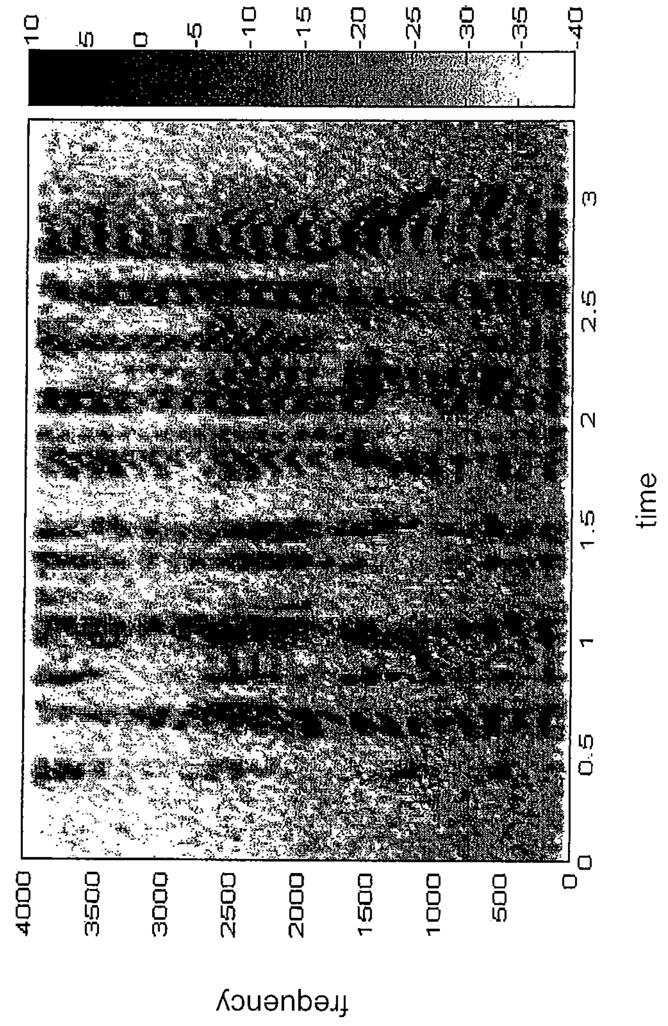
FIG. 10 is a spectrogram of an enhanced speech signal and a vehicle noise of high intensity processed by a spectrum reconstruction system.
Figure 11:
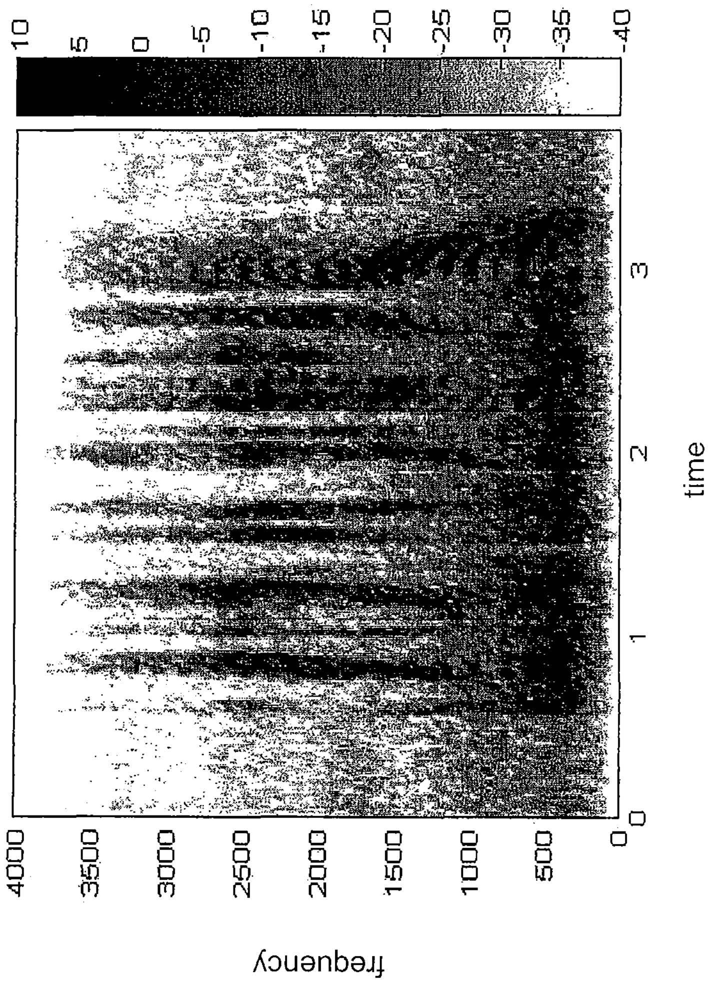
FIG. 11 is a spectrogram of the processed signal of FIG. 9 received from a Code Division Multiple Access network.
Figure 12:
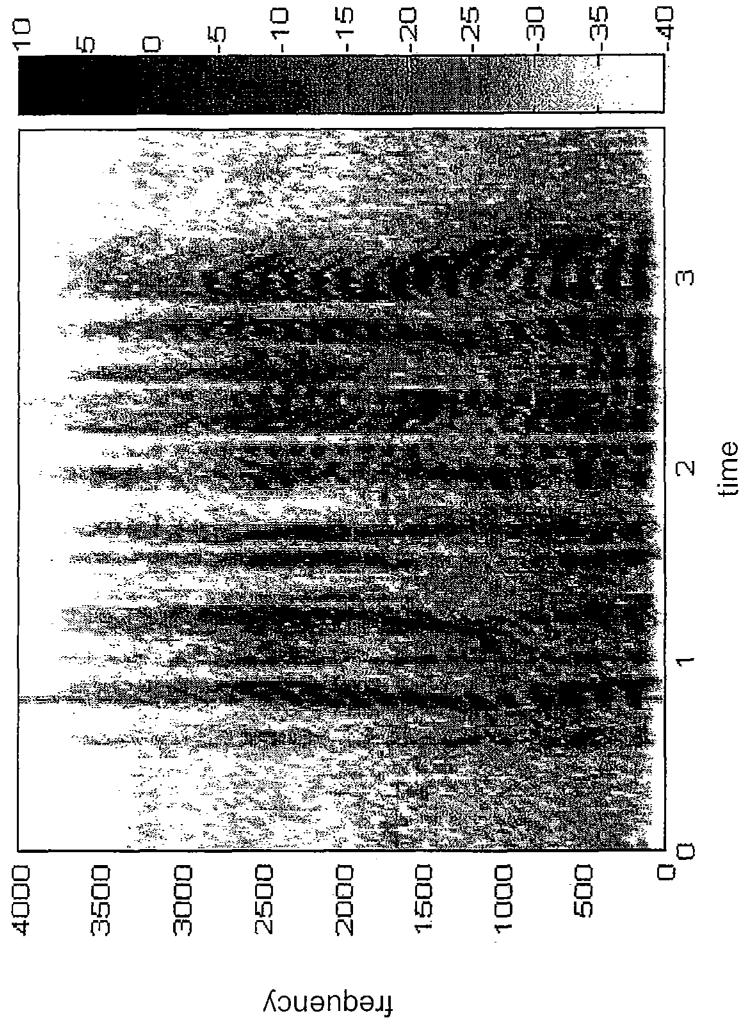
FIG. 12 is a spectrogram of the processed signal of FIG. 10 received from a Code Division Multiple Access network.

FIG. 8 is a spectrograph of an unprocessed or raw speech signal corrupted by vehicle noise. FIG. 9 is a spectrograph of the speech signal of FIG. 8 processed by a static noise reduction system. FIG. 10 is a spectrograph of the speech signal of FIG. 8 processed by a dynamic noise reduction and speech reconstruction system. FIG. 11 is a spectrograph of FIG. 9 received through a wireless multiplexed network (e.g., a code division multiple access or CDMA). FIG. 12 is a spectrograph of FIG. 10 received through a wireless multiplexed network (e.g., a code division multiple access or CDMA). These figures show how the speech reconstruction systems are able to reconstruct the resonance frequencies (e.g., the dark bands in FIGS. 10 and 12) at lower frequencies.

The speech reconstruction system improves speech intelligibility and/or speech quality. The reconstruction may occur in real-time (or after a delay depending on an application or desired result) based on signals received from an input device such as a vehicle microphone, speaker, piezoelectric element or voice activity detector, for example. The system may interface additional compensation devices and may communicate with system that suppresses specific noises, such as for example, wind noise from a voiced or unvoiced signal (e.g., speech) such as the system described in U.S. patent application Ser. No. 10/688,802, entitled "System for Suppressing Wind Noise" filed on Oct. 16, 2003, or background noise from a voiced or unvoiced signal (e.g., speech) such as the system described in U.S. application Ser. No. 11/923,358, entitled "Dynamic Noise Reduction" filed Oct. 24, 2007, which is incorporated by reference.

The system may dynamically reconstruct speech in a signal detected in an enclosure or an automobile. In an alternate system, aural signals may be selected by a dynamic filter and the harmonics may be generated by a harmonic processor (e.g., programmed to process a non-linear function). Signal power may be measured by a power processor and the level of background nose measured or estimated by a background noise processor. Based on the output of the background noise processor multiple linear relationships of the background noise may be modeled by a linear model processor. Harmonic gain may be rendered by a controller, an amplifier, or a programmable filter. In some systems the programmable filter, signal processor, or dynamic filter may select or filter the output to reconstruct speech.

Other alternate speech reconstruction systems include combinations of some or all of the structure and functions described above or shown in one or more or each of the Figures. These speech reconstruction systems are formed from any combination of structure and function described or illustrated within the figures. The logic may be implemented in software or hardware. The hardware may be implemented through a processor or a controller accessing a local or remote volatile and/or non-volatile memory that interfaces peripheral devices or the memory through a wireless or a tangible medium. In a high noise or a low noise condition, the spectrum of the original signal may be reconstructed so that intelligibility and signal quality is improved or reaches a predetermined threshold.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system that improves speech intelligibility by reconstructing speech segments comprising:

a low-frequency reconstruction controller programmed to select a predetermined portion of a time domain speech signal while substantially blocking or substantially attenuating signals above and below the selected predetermined portion;

a harmonic generator coupled to the low-frequency reconstruction controller programmed to generate low-frequency harmonics of reconstructed speech in the time domain that lie within a frequency range controlled by a background noise modeler;

a gain controller configured to adjust the low-frequency harmonics to substantially match the signal strength in the time domain signal; and a lowpass filter having a frequency response based on a dynamic noise from changing noise conditions within a vehicle, the lowpass filter configured to receive the adjusted low-frequency harmonics and output a selected portion of the adjusted low-frequency harmonics based on the frequency response and a threshold.

2. The system that improves speech intelligibility of claim 1 where the gain controller comprises a weighting filter programmed to emphasize the low-frequency harmonics during time periods of minimal speech identified by a voice activity detector.

3. The system that improves speech intelligibility of claim 1 where the gain controller comprises a weighting filter programmed to emphasize the low-frequency harmonics when high levels of background noise is detected by a noise detector.

4. The system that improves speech intelligibility of claim 1 where the signal strength comprises a power level.

5. A system that improves speech intelligibility by reconstructing speech comprising:

a first filter that passes a portion of an input signal within a varying range while substantially blocking signals above and below the varying range;

a non-linear transformation controller configured to generate harmonics of reconstructed speech in the time domain;

a multiplier configured to adjust the amplitudes of the harmonics based on an estimated energy in the input signal; and a second filter in communication with the multiplier having a frequency response based on a dynamic noise from changing noise conditions within a vehicle that is detected in the input signal, the second filter configured to receive the amplitude-adjusted harmonics and select a portion of the amplitude-adjusted harmonics based on the frequency response while minimizing or dampening a remaining portion.

6. The system that improves speech intelligibility of claim 5 where the first filter comprises:

an electronic circuit that passes substantially all frequencies in the input signal that are above a predetermined frequency.

7. The system that improves speech intelligibility of claim 6 where the first filter further comprises:

a second electronic circuit that allows nearly all frequencies in the input signal that are below a predetermined frequency to pass through it.

8. The system that improves speech intelligibility of claim 5, further comprising:

a spectral converter that is configured to digitize and convert the input signal into the frequency domain;

a background noise estimator configured to measure a background noise that is present in the input signal;

a spectral separator in communication with the spectral converter and the background noise estimator that is configured to divide a power spectrum of a noise estimate; and a modeler in communication with the spectral separator that fits a plurality of substantially linear functions to differing portions of the background noise estimate;

where the frequency response of the second filter is based on the plurality of substantially linear functions.

9. The system that improves speech quality of claim 8 where the modeler is configured to approximate a plurality of linear relationships.

10. The system that improves speech quality of claim 9 where the modeler is configured to fit a line to a portion of a medium to low frequency portion of an aural spectrum and a line to a high frequency portion of the aural spectrum.

11. The system that improves speech quality of claim 8 where the background noise estimator comprises a power estimator.

12. A system that reconstructs speech in real time comprising:

an input filter that passes a band limited frequency in an aural bandwidth when a speech is detected;

a harmonic generator programmed to reconstruct portions of speech masked by a dynamic noise from changing noise conditions within a vehicle, the harmonic generator generating harmonics of reconstructed speech that occur in a full frequency range of the input filter;

a gain controller that dynamically adjusts the signal strength of the generated harmonics to a targeted level based on a signal within the aural bandwidth;

a speech reconstruction filter that receives the dynamically adjusted harmonics and allows a portion of the dynamically adjusted harmonics to pass through it based on a frequency response of the speech construction filter and a threshold, the frequency response based on the dynamic noise; and a perceptual filter configured to combine an output of the speech reconstruction filter with the original input speech signal.

13. The system that reconstructs speech in real time of claim 12 where the passband of the input filter occurs near a low frequency range where speech harmonics are likely to be corrupted by noise.

14. The system that reconstructs speech in real time of claim 12 where the adjustment is based on a power ratio between the original input signal and the reconstructed signal.

15. The system that reconstructs speech in real time of claim 12 where the gain controller continuously varies the signal strength of the generated harmonics.

16. The system that reconstructs speech in real time of claim 12 where the harmonic generator is programmed to process a non-linear function.

17. The system that reconstructs speech in real time of claim 12 further comprising means to detect speech.

18. A method that compensates for undesired changes in a speech segment, comprising:

selecting a portion of a speech segment lying or occurring in an intermediate frequency band near a low frequency portion of an aural bandwidth;

synthesizing harmonics of reconstructed speech using signals that lie or occur within the intermediate frequency band;

adjusting the gain of the synthesized harmonics by processing a correlation between the strength of the synthesized harmonics and the strength of the original speech signal;

filtering a portion of the adjusted synthesized harmonics based on a dynamic noise from changing noise conditions within a vehicle that is detected in the speech; and weighting the filtered portion of the adjusted synthesized harmonics to reconstruct the speech segment lying in the intermediate frequency band.

19. The method that compensates for undesired changes in a speech segment of claim 18 where the act of weighting is based on multiple frequency responses that allow substantially all the frequencies bellows a plurality of specified frequencies to pass through.

20. The method that compensates for undesired changes in a speech segment of claim 18 where the act of weighting is based on a plurality of background noise estimates.

21. The method that compensates for undesired changes in a speech segment of claim 18 where the act of weighting is based on a plurality of linear modes.

22. The system of claim 1, wherein the frequency response of the lowpass filter comprises a dynamic frequency response having a cutoff frequency that varies according to the dynamic noise.

* * * * *